Figure 1:
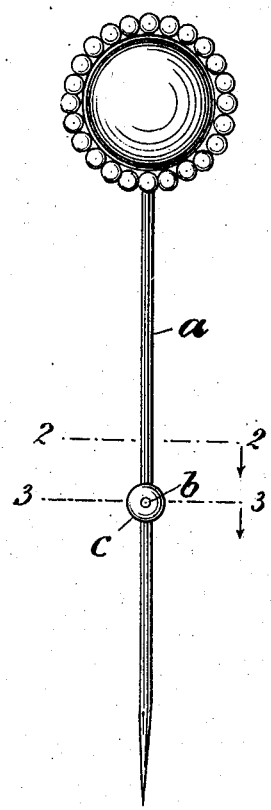

No. 823,743. PATENTED JUNE 19, 1906.
E. L. SCHREIBER.
SAFETY ATTACHMENT FOR SCARF PINS.
APPLICATION FILED DEC. 5, 1905.

WITNESSES
INVENTOR
Elias L. Schreiber,
BY
Edgar Tate & Co.
ATTORNEYS

UNITED STATES PATENT OFFICE.

ELIAS L. SCHREIBER, OF NEW YORK, N. Y., ASSIGNOR OF ONE-HALF TO DENIZEN H. PHILLIPS, OF NEW YORK, N. Y.

SAFETY ATTACHMENT FOR SCARF-PINS.

No. 823,743.     Specification of Letters Patent.     Patented June 19, 1906.

Application filed December 5, 1905. Serial No. 290,344.

*To all whom it may concern:*

Be it known that I, ELIAS L. SCHREIBER, a citizen of the United States, residing at New York, in the county of New York and State of New York, have invented certain new and useful Improvements in Safety Attachments for Scarf-Pins, of which the following is a specification, such as will enable those skilled in the art to which it appertains to make and use the same.

This invention relates to safety attachments for scarf and similar pins, and the object thereof is to provide an improved device of this class which may be conveniently connected with an ordinary scarf or similar pin without any change in the form or construction of the pin and which may be easily detached therefrom and which when secured to the pin will prevent the withdrawal thereof from a garment or other article through which the pin is passed.

The invention is fully disclosed in the following specification, of which the accompanying drawings form a part, in which the separate parts of my improvement are designated by suitable reference characters in each of the views, and in which—

Figure 2:
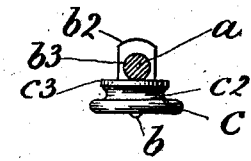

Figure 1 is a front view of a scarf-pin provided with my improved safety attachment; Fig. 2, a section on the line 2 2 of Fig. 1 and on an enlarged scale, and Fig. 3 a section on the line 3 3 of Fig. 1 and also on an enlarged scale.

In the drawings forming part of this specification I have shown at $a$ an ordinary scarf-pin, and in the practice of my invention I provide a safety attachment comprising a screw $b$, having a large head $b^2$, provided transversely with a passage or opening $b^3$, through which the pin $a$ is adapted to be passed.

Figure 3:
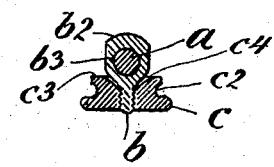

Mounted on the screw $b$ is a nut $c$, provided at one side with a projecting member or hub $c^3$, in which is preferably formed an annular groove $c^2$, and the projecting member or hub $c^3$ is provided with a recess $c^4$, adapted to receive the adjacent part of the head $b^2$ of the screw $b$, which is beveled so as to enter said recess, as clearly shown in Fig. 3.

In using this device for the purpose herein specified, the pin $a$ after being passed through a garment, scarf, or other article is passed through the head $b^2$ of the screw $b$, and the nut $c$ is then turned on the screw $b$ until the rim of the projecting member or hub $c^3$ presses on said pin, and this locks the attachment to the pin, as will be readily understood, and the pin cannot be pulled out of the garment, scarf, or other article and will not become accidentally detached therefrom, and in order to remove the pin the nut $c$ must be loosened or turned so that the rim of the hub or member $c^3$ will not press on the pin.

It is a well-known fact that scarf and similar pins are frequently lost by becoming accidentally detached, and are also frequently stolen by being withdrawn from the scarf or other article in which they are placed, without the knowledge of the owner; but with my improvement the accidental loss of a pin of this class is prevented, as it will not work out of the scarf or other article in which it is placed, and the stealing thereof without the knowledge of the owner is also prevented, as the pin cannot be withdrawn from the scarf or other article in which it is placed without first removing the attachment, and this cannot be done without the knowledge of the owner of the pin.

Having fully described my invention, what I claim as new, and desire to secure by Letters Patent, is—

A safety attachment for scarf and other pins, comprising a screw provided with a head having transversely therethrough an opening through which the pin may be passed, and a nut mounted on said screw and provided at one side with a projection or hub member having a recess adapted to receive a part of the head of the screw, the rim of the projection or hub member being adapted to bear on the pin, substantially as shown and described.

In testimony that I claim the foregoing as my invention I have signed my name, in presence of the subscribing witnesses, this 2d day of December, 1905.

ELIAS L. SCHREIBER.

Witnesses:
BENJAMIN D. BENDTER,
HARRY D. PHILLIPS